US008814459B1

(12) United States Patent
Berge (10) Patent No.: US 8,814,459 B1
(45) Date of Patent: Aug. 26, 2014

(54) ADJUSTABLE ADAPTOR KIT FOR RECESSED CAN FIXTURES

(76) Inventor: Arthur J. Berge, Murrieta, CA (US)

( * ) Notice: Subject to any disclaimer, the term of this patent is extended or adjusted under 35 U.S.C. 154(b) by 198 days.

(21) Appl. No.: 12/686,364

(22) Filed: Jan. 12, 2010

Related U.S. Application Data (60) Provisional application No. 61/144,730, filed on Jan. 14, 2009.

(51) Int. Cl.
*F16B 7/10* (2006.01)
*F16B 7/14* (2006.01)

(52) U.S. Cl.
USPC .............. 403/109.8; 403/109.1; 403/377; 403/378; 403/316; 362/365; 439/537

(58) Field of Classification Search
USPC ........ 403/109.1, 109.2, 109.8, 327, 377, 316, 403/378, 376, 109.3, 263, 315, 317, 318, 403/319, 328, 355, 383; 362/148, 288, 364, 362/365, 457; 439/537, 96
See application file for complete search history.

(56) References Cited

U.S. PATENT DOCUMENTS

| | | | | | |
|---|---|---|---|---|---|
| 2,241,457 | A | * | 5/1941 | Hagler et al. .............. | 200/61.31 |
| 2,748,261 | A | * | 5/1956 | Wolar ........................ | 403/107 |
| 2,753,445 | A | * | 7/1956 | Thomas et al. ............. | 362/404 |
| 3,222,478 | A | * | 12/1965 | More .......................... | 337/197 |
| 3,298,409 | A | * | 1/1967 | Elson ......................... | 403/377 |
| 3,392,361 | A | * | 7/1968 | Peavey ....................... | 439/92 |
| 3,518,420 | A | * | 6/1970 | Kripp ......................... | 362/257 |
| 3,741,592 | A | * | 6/1973 | Muncy ........................ | 403/377 |
| 3,933,403 | A | * | 1/1976 | Rubesamen et al. ........ | 439/121 |
| 4,093,974 | A | * | 6/1978 | Wheeler ..................... | 362/216 |
| 4,127,354 | A | * | 11/1978 | Mixon, Jr. ................... | 403/279 |
| 4,183,604 | A | * | 1/1980 | Tjornhom, Sr. ............. | 439/300 |
| 4,318,578 | A | * | 3/1982 | Ericson et al. .............. | 439/106 |
| 4,327,402 | A | * | 4/1982 | Aubrey ....................... | 362/288 |
| 4,364,685 | A | * | 12/1982 | Janz ............................ | 403/108 |
| 4,763,233 | A | * | 8/1988 | Poyer .......................... | 362/477 |
| 4,952,157 | A | * | 8/1990 | Hudson et al. ............... | 439/92 |
| 5,823,664 | A | * | 10/1998 | Demshki, Jr. et al. ....... | 362/366 |
| 6,095,660 | A | * | 8/2000 | Moriyama et al. ........... | 362/147 |
| 6,099,144 | A | * | 8/2000 | Klaus .......................... | 362/263 |
| 6,168,298 | B1 | * | 1/2001 | Hentz et al. .................. | 362/148 |
| 6,343,873 | B1 | * | 2/2002 | Eberhard et al. ............. | 362/364 |
| 6,464,179 | B1 | | 10/2002 | Bulvan et al. | |
| 6,485,031 | B2 | * | 11/2002 | Chen ........................... | 403/378 |
| 6,565,230 | B2 | * | 5/2003 | Ashley ........................ | 362/650 |
| 6,866,399 | B2 | * | 3/2005 | Eaton, Jr. .................... | 362/260 |
| 6,979,108 | B1 | * | 12/2005 | Berge .......................... | 362/442 |
| RE39,327 | E | * | 10/2006 | Reasoner .................... | 403/327 |
| 7,247,049 | B2 | | 7/2007 | Ratican | |
| 7,311,425 | B2 | | 12/2007 | Jervey, III | |
| 7,344,117 | B2 | * | 3/2008 | She ............................. | 248/408 |

(Continued)

*Primary Examiner* — Joshua Kennedy
*Assistant Examiner* — Matthew R McMahon
(74) *Attorney, Agent, or Firm* — Wallace G. Walter (57) ABSTRACT

An adaptor kit or system for use with conventional can light fixtures to adapt the can light fixture for use as a hanger assembly for auxiliary fixtures such as a hanging lamp, a flush-mounted lamp, or the like includes a stem member received within a stem-receiver. The stem-member includes a plurality of axial spaced detent positions and the stem-receiver includes a resilient spring clip the yieldable engages a one of the available detent position. Application of a sufficient axial force causes the spring clip to disengage with a current detent and re-engage with another detent to allow controlled extension thereof by an installer.

5 Claims, 9 Drawing Sheets

(56) References Cited

U.S. PATENT DOCUMENTS

| | | |
|---|---|---|
| 7,377,817 B1 | 5/2008 | Switzer |
| 7,614,769 B2 * | 11/2009 | Sell ............................... 362/365 |
| 7,658,517 B2 * | 2/2010 | Czech et al. .................. 362/364 |
| 7,704,008 B2 * | 4/2010 | Shinozaki et al. ............ 403/327 |
| 7,837,508 B1 * | 11/2010 | Switzer ......................... 362/147 |
| 7,862,215 B2 * | 1/2011 | Jowid ............................ 362/374 |
| 8,348,582 B2 * | 1/2013 | Bithell et al. ................. 411/513 |
| 2003/0161149 A1 * | 8/2003 | Eaton, Jr. ...................... 362/223 |
| 2006/0013009 A1 | 1/2006 | Falco |
| 2007/0177390 A1 | 8/2007 | Evans |
| 2008/0225531 A1 * | 9/2008 | Shiller et al. .................. 362/365 |

* cited by examiner

ADJUSTABLE ADAPTOR KIT FOR RECESSED CAN FIXTURES

CROSS-REFERENCE TO RELATED APPLICATION

This application claims the benefit of U.S. provisional patent application No. 61/144,730 filed Jan. 14, 2009 by the inventor herein, the disclosure of which is incorporated herein by reference.

BACKGROUND

The present invention relates to an adaptor or conversion kit or system for use with "can light" or "can fixture" assemblies to adapt the can light for other uses, including, for example, use as a hanger for a suspended or hanging lamp, a flush-mount lamp, or other devices that are designed to be attached to or modified for attachment to a can light assembly.

Recessed ceiling lighting fixtures are located within or recessed within a ceiling. A light bulb or other type of lamp is located within the housing and is positioned so that the lowermost point of the lamp is somewhat above, flush with, or slightly below the ceiling. Lighting fixtures of this type, also known as "can lights" or "can fixtures," are well known in both new construction and in retrofit situations due, in part, to the unobtrusive nature of the fixtures themselves and of their desirable illumination pattern.

Figure 1:
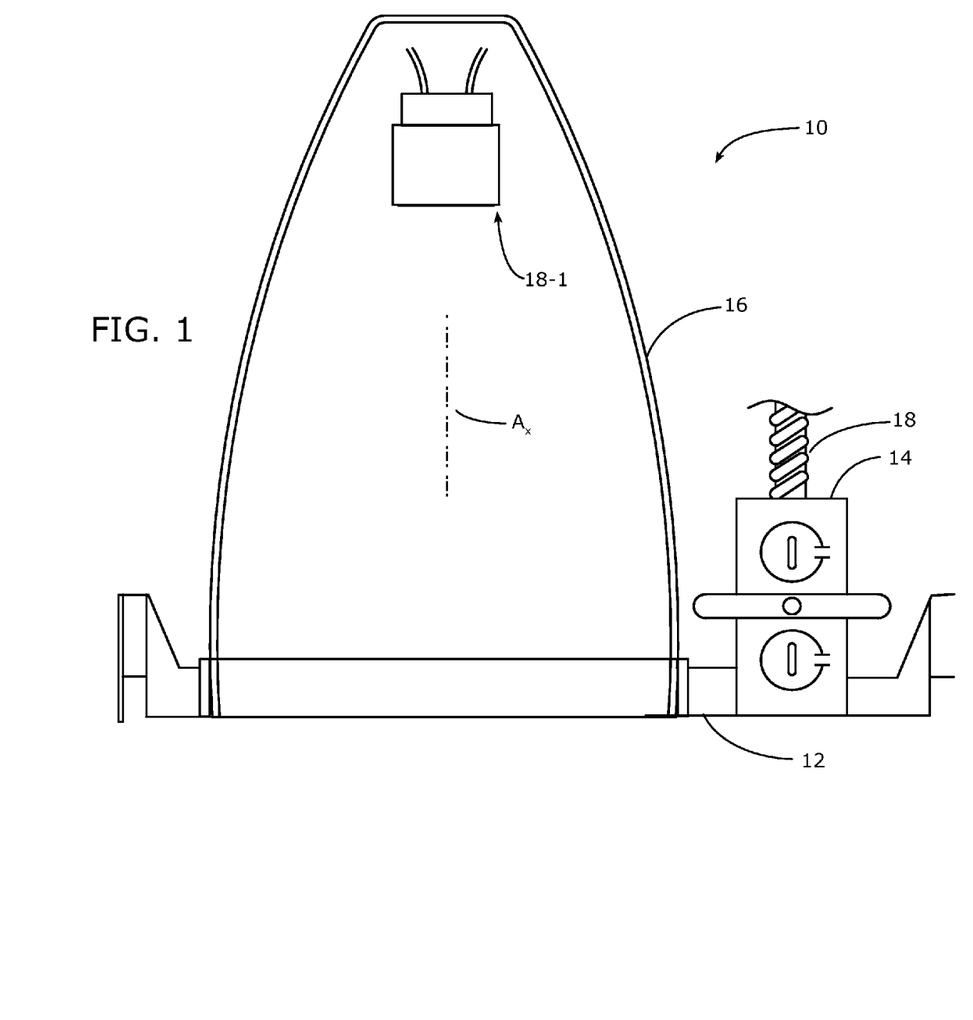
FIG. 1 is a side-elevational view, in partial cross-section, of a generalized or representative can light assembly.

A representative example of a "can light" assembly of the type used in new construction is shown in side elevation view in FIG. 1 and is designated therein by the reference character 10. The particular organization and structure shown is exemplary only and is representative of a widely variety of can light fixtures marketed by various manufacturers. As shown, the fixture 10 includes a frame or frame-like pan structure 12 which mounts an electrical junction box 14 and a can 16. The can 16 and the junction box 14 are connected by a standard conduit 18 through which insulated wiring (not shown) extends from the junction box 14 to the interior of the can 16 to provide power to a standard socket 18-1 and lamp (not shown) installed in the socket 18-1. The frame structure 12 is mounted by adjustable hanger bar assemblies (only one of which is shown) between joists (not shown) above a ceiling in which an appropriately sized opening is formed.

The can 16 is typically formed from thin-walled metal, such as aluminum, that is pressed or otherwise formed into shape as a dome-like surface of revolution about a central axis $A_x$; in some designs, the can is formed as a cylinder and, in other designs, the can is formed from two or more pieces. The can 16 is often designed to be moved or adjusted vertically (i.e., along the up/down axis A) throughout a limited range of motion in its frame 12. In general, the diameter of the open, lower end of the can for the majority of manufacturers in the can light market is between three and eight inches, although some manufacturers will provide cans with somewhat larger open, lower ends.

As also shown in FIG. 1, the lamp socket assembly is mounted on or attached to an interior surface portion of the can 16 by a suitable bracket (not shown); electrical wires extend from the socket through an opening (not specifically shown) in the can 16 and through the conduct 18 to the junction box 14. In FIG. 1, the lamp socket is shown as a classic screw-base type socket; as can be appreciated other types of sockets, including more recent pin-type sockets can be used.

In a normal or typical installation, a lamp, such as an incandescent or a fluorescent lamp, (not shown) is threaded into or otherwise coupled to the socket to provide illumination.

Can light fixtures of the type described above are in common usage and perform their lighting function as intended. However, because can light fixtures are "single function" devices, they lack a certain flexibility for use in related functions, such as a support for a hanging or suspended lamp or lighting fixture or as a support for a flush-mounted ceiling lamp.

SUMMARY OF THE INVENTION

In view of the above, it is an object of the present invention, among others, to provide an adjustable adaptor kit or system for use with conventional can light fixtures to adapt the can light fixture for use as a hanger assembly for hanging or suspended lamps or pendant lamps and to adapt the can light assembly for other types of non-recessed lamps, including flush-mounted lamps.

In a preferred embodiment, an adjustable adaptor assembly includes a stem member that is adjustably received and retained in a stem-receiver. A socket adaptor at the upper end of the stem member is received within a lamp socket in the can light with the position of the stem-receiver adjusted to position the bottom of the adaptor assembly for receiving a coverplate or medallion.

The present invention advantageously provides an adaptor kit system for use with can light assemblies to increase the usefulness of those assemblies.

DESCRIPTION OF THE PREFERRED EMBODIMENTS

A preferred embodiment of the present invention is assembled from two major components to define an extensible assembly 100 shown in FIG. 4A-4C and FIGS. 5A-5D.

A stem member 20, as shown in FIGS. 2A-2E, is formed as an elongated cylinder-like component and includes an internal through bore or opening 22, external screw threads 24 at an upper end and a series of ridge-like striations, serrations, or teeth 26 that extend from the external threads 24 to a lower end. Additionally, the stem 20 is provided with flat surfaces 28 on opposite sides thereof that also extend from the external threads to the lower end. At least one and optionally both flat surfaces 28 have a slot 30 formed therein.

Figure 2A:
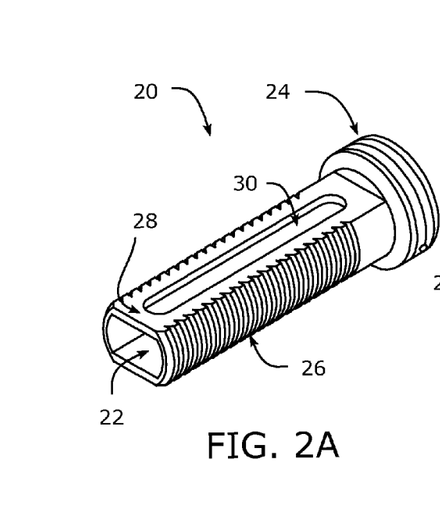
FIG. 2A is a perspective view of a stem member.
Figure 2B:
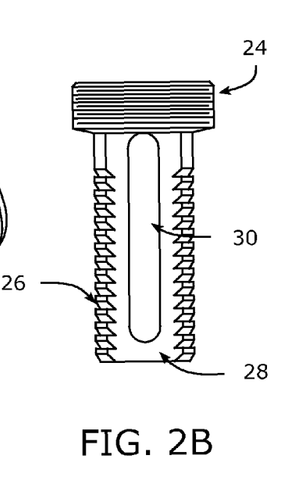
FIG. 2B is a first side elevation view of the stem member shown in FIG. 2A.
Figure 2C:
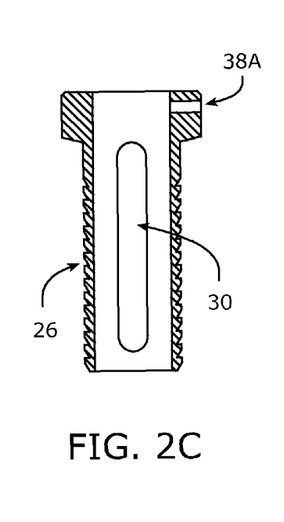
FIG. 2C is a cross section view of the stem member shown in FIG. 2B.
Figure 2D:
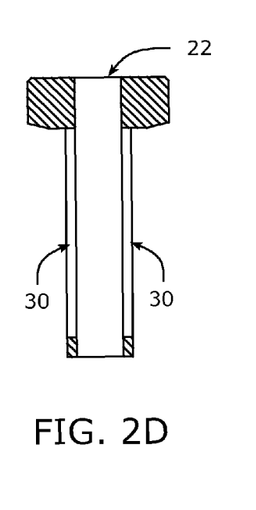
FIG. 2D is a second side elevation view of the stem member shown in FIG. 2A.
Figure 2E:
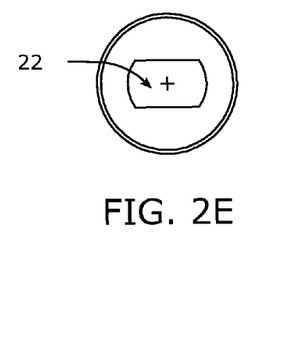
FIG. 2E is a top view of the stem member shown in FIG. 2B.

As explained in more detail below, a cap 32 (FIGS. 2F-2G) is designed to be assembled to the stem member 20. As shown, the cap 32 is generally cylindrical with a through bore 34 and includes internal screw threads 36 designed to engage the external screw threads 24 of the stem member 20. In addition, a radial bore 38 is provided in the side of the cap 32 to accept a threaded fastener (not shown) that, additionally, is threaded into a bore 38A in the stem 20 (FIG. 2C).

Figures 3A, 3B, 3C, 3D, 3E, 3F, 3G, 3H:
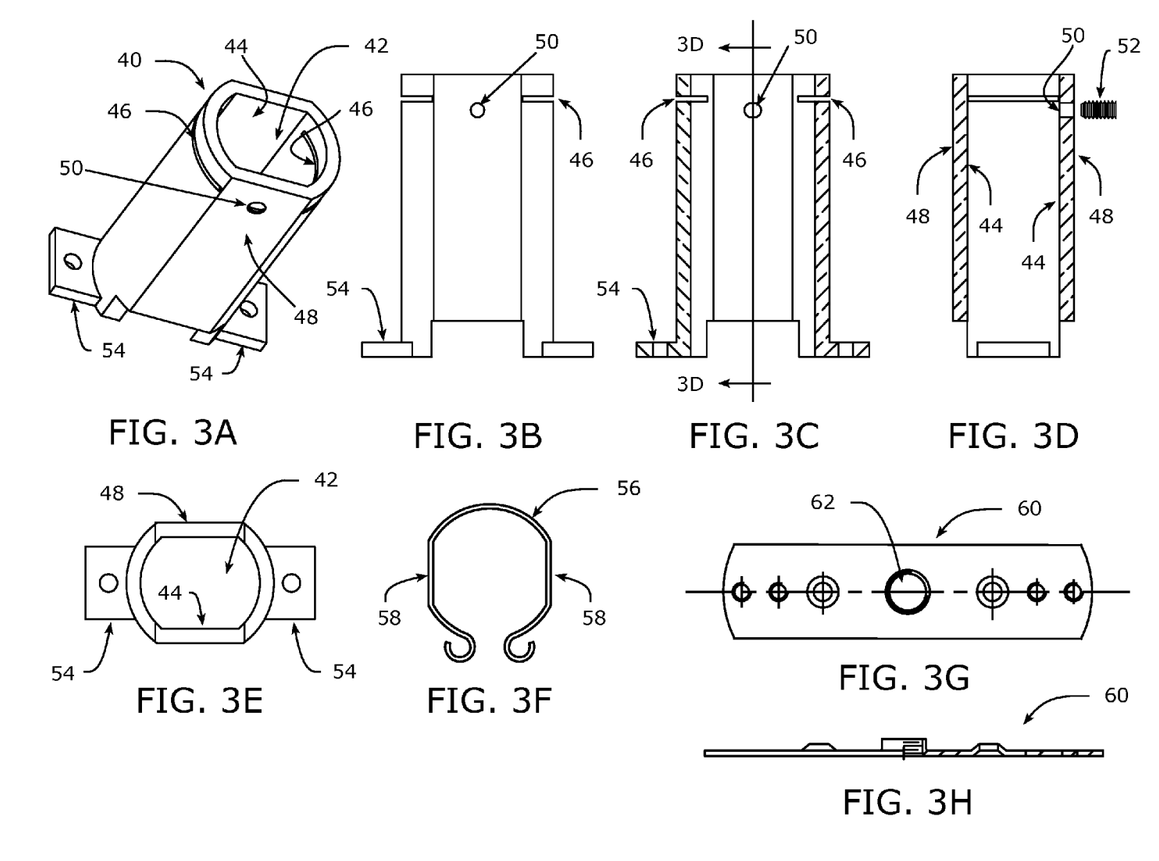
FIG. 3A is a perspective view of a stem-receiving housing.
FIG. 3B is a first side elevation view of the stem-receiving housing shown in FIG. 3A.
FIG. 3C is a cross section view of the stem-receiving housing shown in FIG. 3A.
FIG. 3D is a second side elevation view of the stem-receiving housing shown in FIG. 3A taken along line 3D-3D of FIG. 3C.
FIG. 3E is a top view of the stem-receiving housing of FIG. 3A.
FIG. 3F is a plan view of a spring clip.
FIG. 3G is a plan view of a cross-bar.
FIG. 3H is a side elevation view of the cross-bar of FIG. 3G.

A stem-receiver 40 is shown in FIGS. 3A-3E and is designed to receive and releasably retain the stem member 20 in a telescoping relationship. As shown, the stem-receiver 40 is formed as a hollow member having an internal passageway 42 with opposed internal flat surfaces 44 designed to accommodate the flat surfaces 28 of the stem member 20 with a sliding clearance fit therebetween. The exterior of the stem-receiver 40 has external flat surfaces 48 extending the length of the stem-receiver 40. A pair of relatively narrow semi-circumferential slots 46 are formed adjacent the upper end of the stem-receiver 40 and designed to receive portions of a spring clip, as described below. A threaded bore 50 is formed through the side wall of stem-receiver 40 and receives a travelling-limiting screw 52 (FIG. 3D). The lower end of the stem-receiver 40 includes mounting feet or pads 54 that are designed to attach to a cross-bar shown in FIG. 3G.

A spring clip 56 (FIG. 3F) is formed from a resilient spring wire and is designed to encircle the upper end of the stem-receiver 40. The spring clip 56 includes spaced parallel straight segments 58 that are designed to be received in the slots 46 formed adjacent the upper end of the stem-receiver 40; a representative thickness for the wire stock from which the spring clip 56 is fabricated is about 1.2 mm.

A cross-bar 60 is formed from metal flat stock and includes a sufficient number of threaded and non-threaded holes to connect to the pads 54 of the stem-receiver 40 as well as coverplates, medallions, and the like associated with the pendant or hanging lamps to be attached to the adjustable adaptor assembly 100. Additionally, a threaded through-hole 62 is provided in the central portion of the cross-bar 60 through which electrical wires can pass.

Figure 4A:
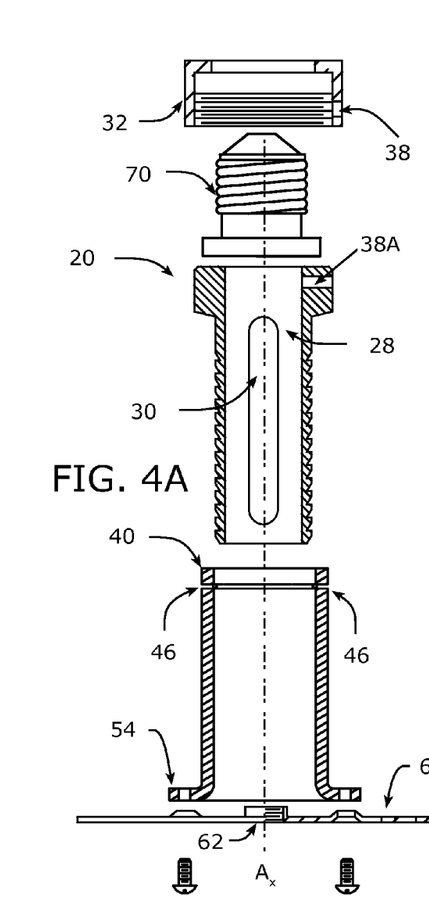
FIG. 4A is a exploded elevation view, in cross section, of an adjustable adaptor assembly.
Figure 4B:
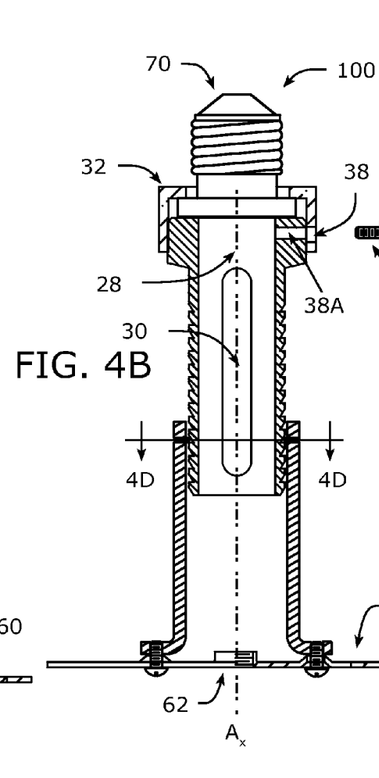
FIG. 4B is an elevation view, in cross section, of the adjustable adaptor assembly in a first assembled relationship.
Figure 4C:
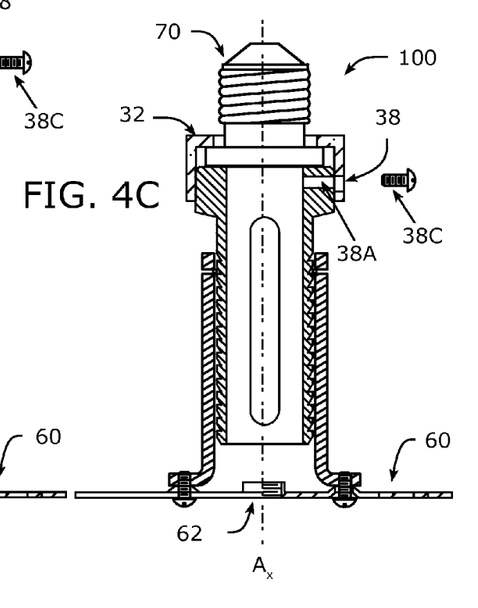
FIG. 4C is an elevation view, in cross section, of the adjustable adaptor assembly in a second assembled relationship.
Figure 5A:
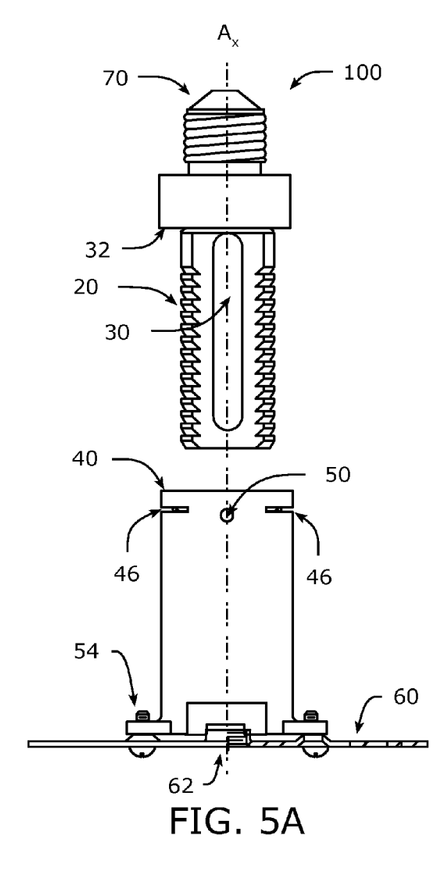
FIG. 5A is an elevation view of the adjustable adaptor assembly corresponding to FIG. 4A.
Figure 5B:
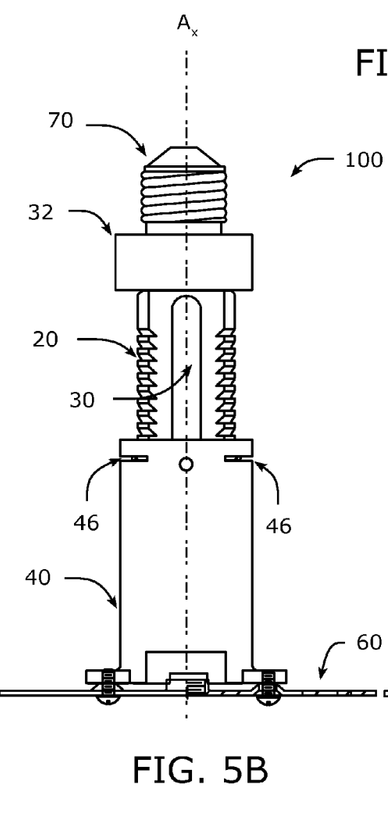
FIG. 5B is an elevation view of the adjustable adaptor assembly corresponding to FIG. 4B.
Figure 5C:
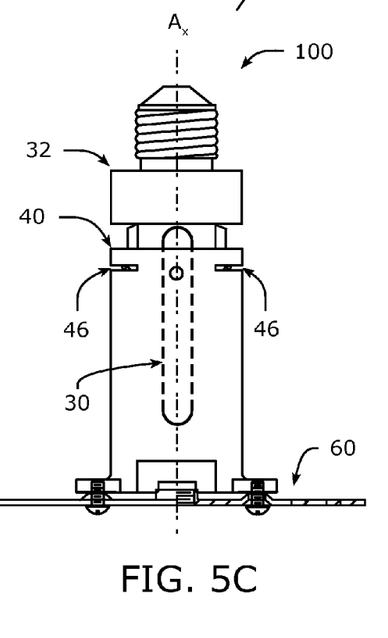
FIG. 5C is an elevation view of the adjustable adaptor assembly corresponding to FIG. 4C.

As shown in the exploded views of FIG. 4A and in FIG. 5A, a conventional Edison-socket light-bulb converter 70 is mounted to the top of the stem member 20 and is secured in place with the cap 32; if desired, the cap 32 can be cemented or glued to the stem member 20. The so-assembled stem member 20 is inserted into the stem-receiver 40 with the spring clip 56 mounted in place in the slots 46 to define the adaptable adjuster assembly 100 that is aligned along an assembly or longitudinal axis A. Thereafter, the screw 52 (FIG. 3D) is threaded in place with the distal or remote end of the screw 52 extending to the slot 30. As explained below, the extent that the stem member 20 is received within the stem-receiver 40 can be varied to change the top-to-bottom dimension of the adaptable adjuster assembly 100 as shown by a comparison of FIGS. 4B and 4C and a comparison of FIGS. 5B and 5C. The screw 52 (FIG. 3D) functions to limit relative movement of the stem member 20 to the extent of the slot 30.

While the preferred embodiment illustrates an Edison-type socket, other socket arrangements can be used, including bayonet-type twist-to-lock arrangements.

Figure 4D:
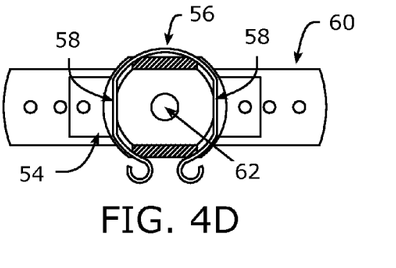
FIG. 4D is a plan view, in cross section, taken along line 4D-4D of FIG. 4B.
Figure 6:
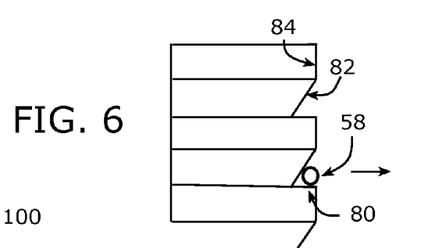
FIG. 6 is an enlarged detail showing the interaction between striations or teeth on the stem member and the spring clip of FIG. 3F.

As shown in the detail view of FIG. 4D and FIG. 6, the straight legs 58 of the spring clip 56 interengage with the projections, serrations, or teeth 26 of the stem member 20 to allow the user to change the top-to-bottom dimension of the adaptable adjuster assembly 100. The spring clip 56 is resiliently biased so that the straight legs 58 'grasp' the stem-member 20 therebetween. As best shown in FIG. 6, the teeth 26 are defined by a ledge 80 surface, an outwardly diverging surface 82, and straight surface 84 that provides a series of recesses or pockets for the straight legs 58. The teeth 26 thus define a series of available "detents" that can receive the legs 58 to retain the so-adjusted relationship between the stem-member 20 and the stem-receiver 40. While a spring clip 56 having two legs 58 that grasp the stem-member 20 therebetween is preferred, other arrangements are suitable, including a spring clip having only one leg thereof that functions as the detent element.

When the stem member 20 is forced downward into the stem-receiver 40, the surface 82 functions as a cam or ramp surface that causes the straight legs 58 to yieldably ride upward on the surface 82 until the straight legs 58 rides on the straight surface 84 to snap into the detent or recess formed by the next adjacent tooth. In general, the spring clip 56 and the teeth are dimensioned so that a force of 3-5 pounds is sufficient to move the stem member 20 into the stem-receiver. 40. Once extended and in the event that a force is applied to the stem member 20 to push it further into the stem-receiver 40, the straight leg portion will bear against the ledge 80 surface to prevent the stem member from being pushed into the stem-receiver 40. In the event an excessively large force is applied to the stem-member 20 to pull it from the stem-receiver 40, the screw 52, which extends into the slot 30, will prevent the parts from separating.

Figure 2F:
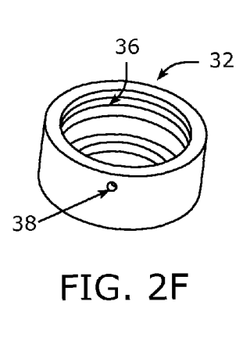
FIG. 2F is a perspective view of a cap member.
Figure 2G:
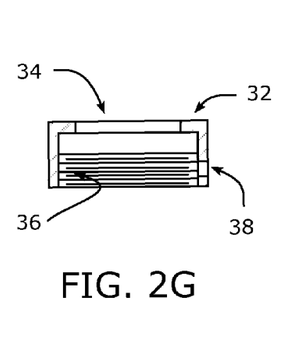
FIG. 2G is a cross section view of the cap member shown in FIG. 2F.
Figure 7A:
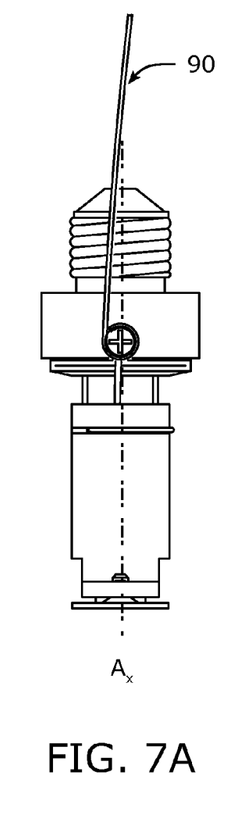
FIGS. 7A and 7B are side views of the adjustable adaptor assembly showing two different ground clips.
Figure 7B:
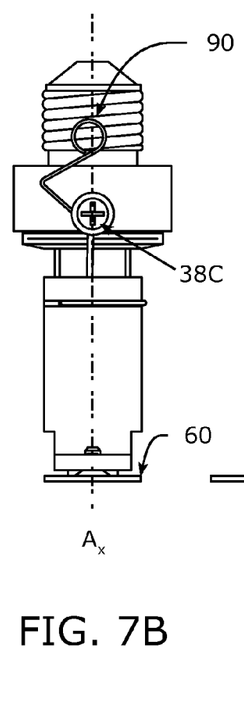
Figure 7C:
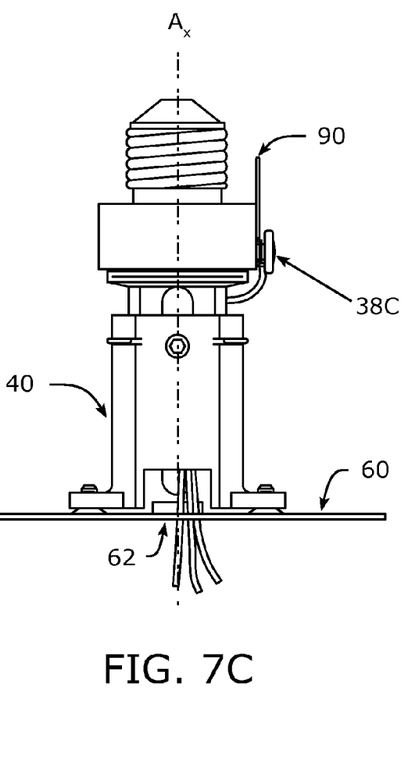
FIGS. 7C and 7D are elevational and elevational cross-section and side views of the adjustable adaptor assembly showing electrical wiring routing.
Figure 7D:
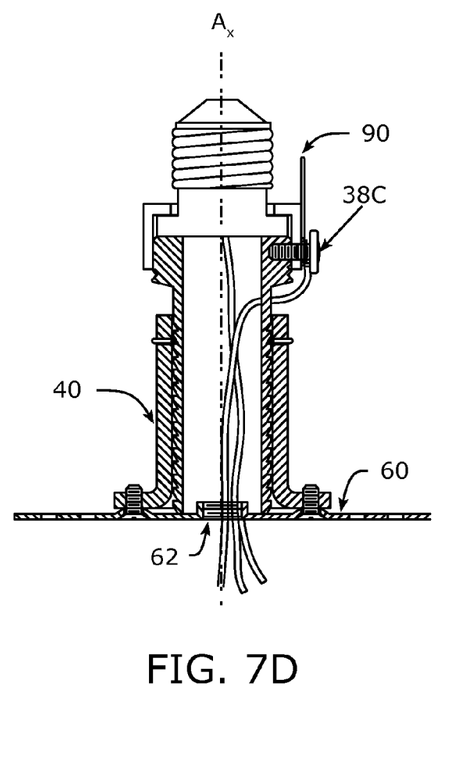

As shown in the various views of FIGS. 7A, 7B, 7C, and 7D, the adjustable adaptor assembly 100 is provided with one of several variants of a grounding clip. As shown in FIG. 7A, the grounding clip 90, which is typically fabricated from a resilient spring steel, is held in place by a screw 38C that is received by bores 38 and 38A (FIGS. 2F and 2C). The grounding clips can be of different configurations (depending upon the applications) as represented by the differences between the grounding clips in FIGS. 7A and 7B. As shown in FIGS. 7C and 7D, the electrical wires pass through the interior of the stem 20 and through the opening 62 in the cross-bar 60.

Figure 8:
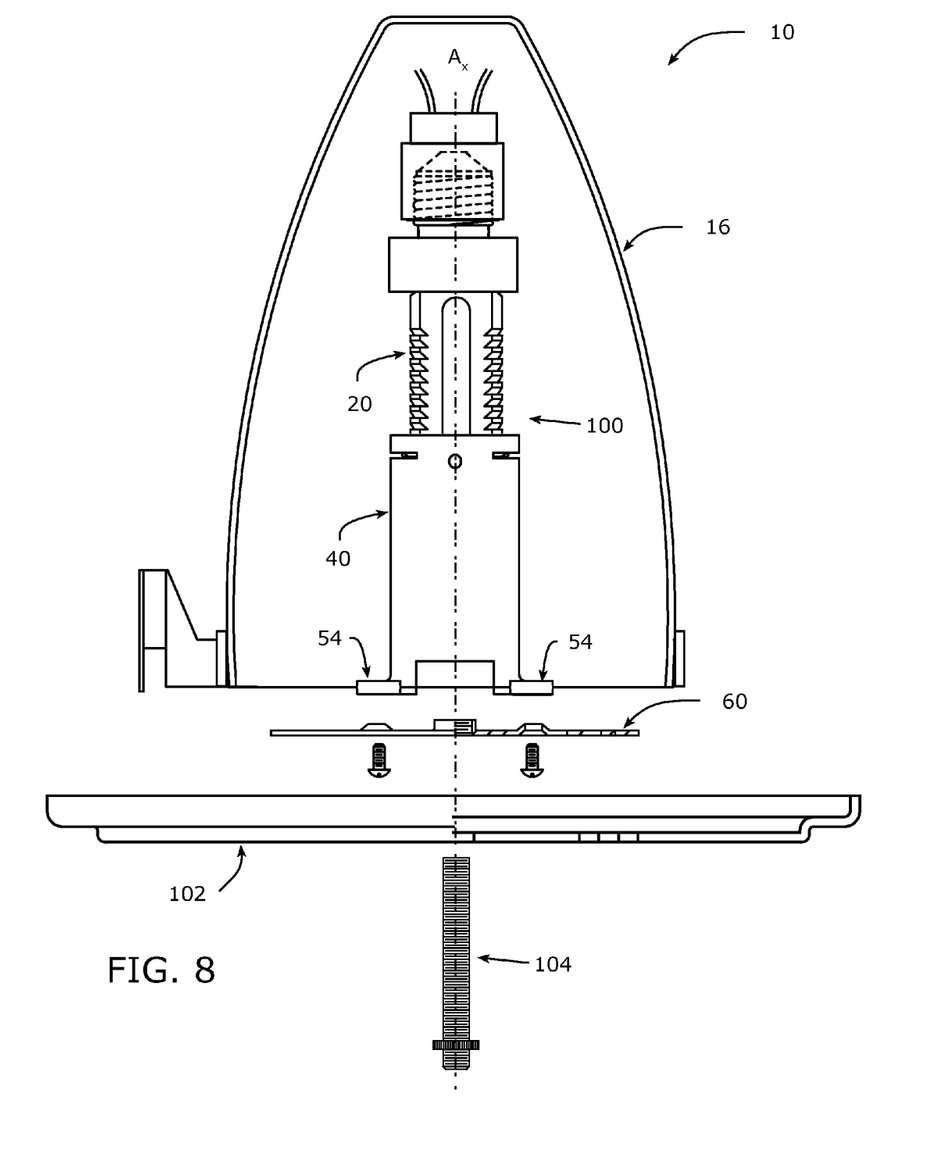
FIG. 8 is a side-elevational view, in partial cross-section, of generalized or representative can light assembly with the adjustable adaptor assembly of FIGS. 2-6 installed in a representative installation.

The adjustable adaptor assembly 100 is used in a manner consistent with FIG. 8. As shown, the upper end of the stem-member assembly is threaded into the lamp socket. Thereafter, the stem-receiver is pulled downward with sufficient force to bring the bottom surface of the pads 54 and the cross-bar 60 into the desired position relative to the ceiling surface. The various wires are threaded (or have been pre-threaded) though the interior spaces of the adjustable adaptor assembly 100 and through the opening 62 of the cross-bar 60, which may include an optional externally threaded nipple 104. Thereafter, a decorative coverplate or medallion 102 is secured with appropriate screws (unnumbered) to complete the installation.

Figure 9:
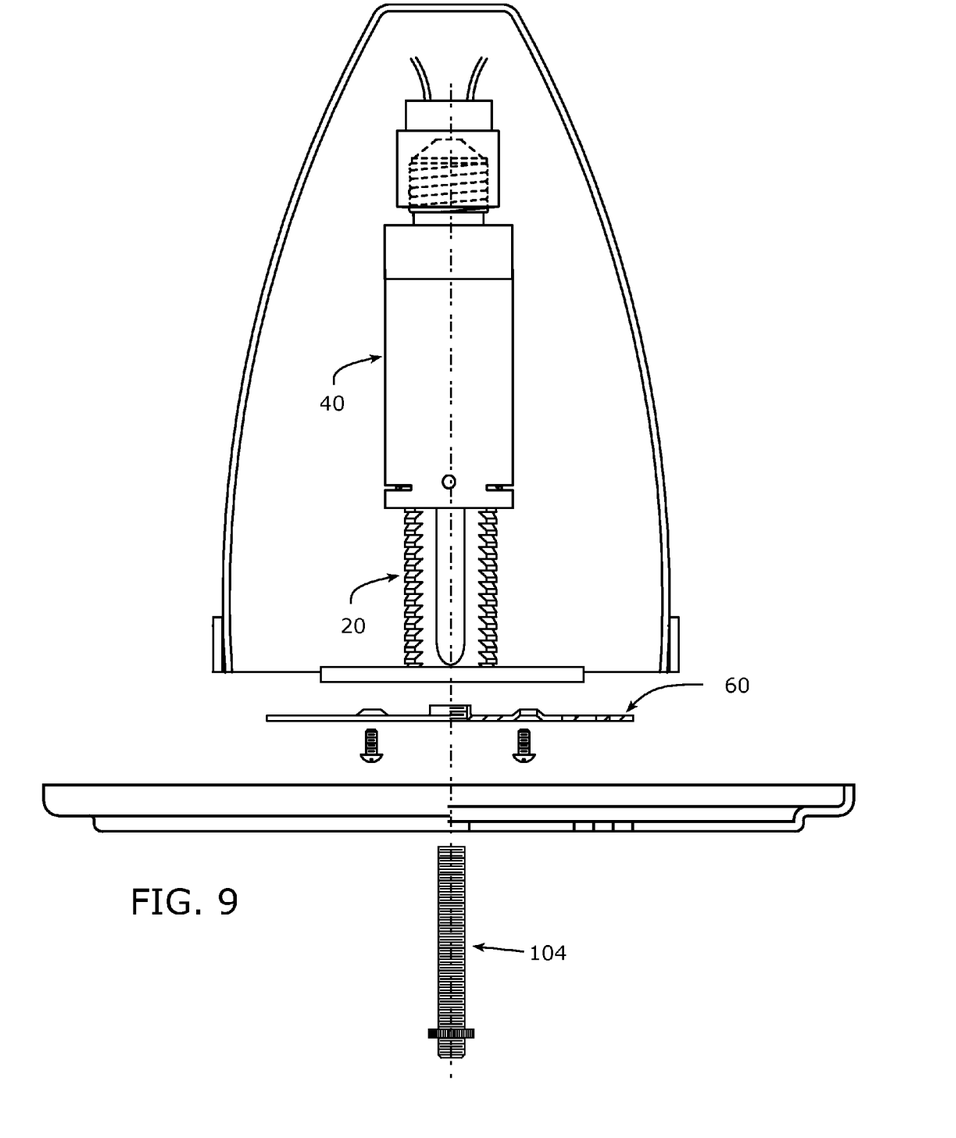
FIG. 9 is a variant of the structure shown in FIG. 8.

The arrangement of the stem-receiver 40 and the stem 20 shown in FIG. 8 is preferred; however and as shown in FIG. 9, the position of the stem 20 and the stem-receiver 40 can be reversed, if desired.

Figure 10:
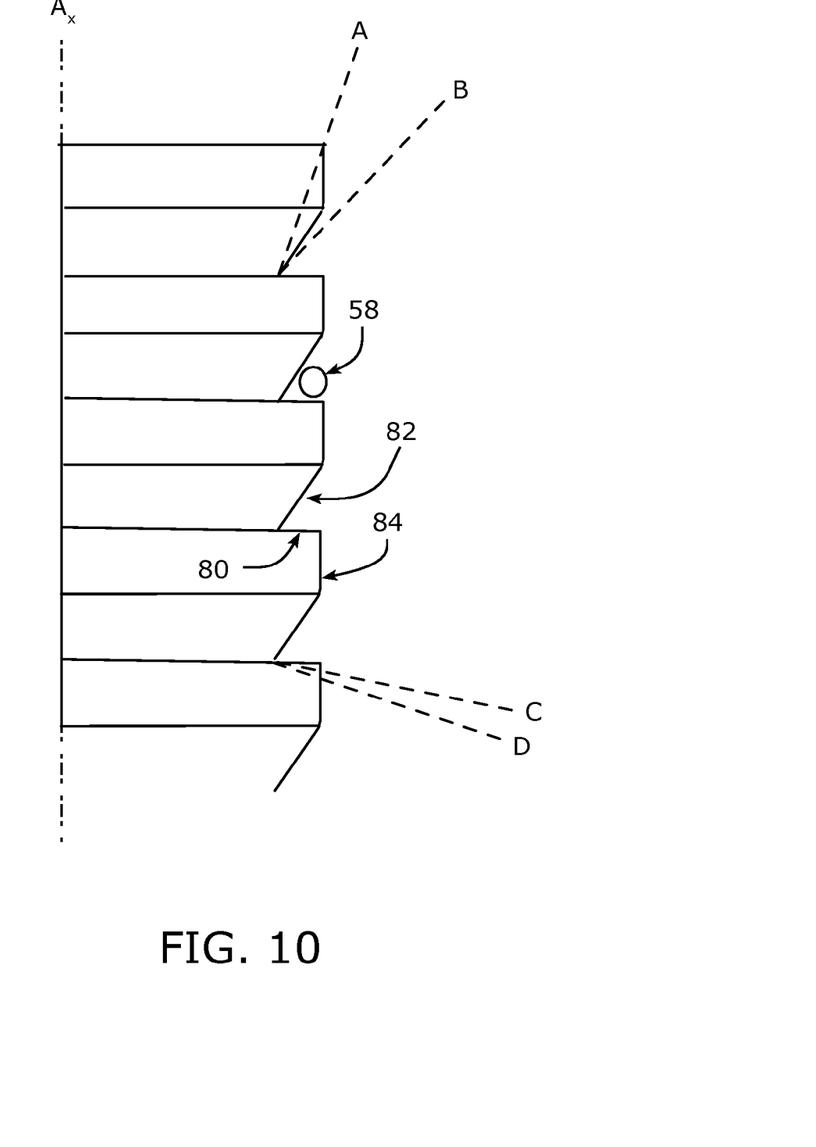
FIG. 10 illustrates optional variants for the structure of striations or teeth.

FIG. 10 illustrates options or variants for the shape of the projections, serrations, or teeth 26 of the stem member 20. For example, the angular relationship of the surface 82 relative to the longitudinal axis $A_x$ can be varied between some range (e.g., lines A and B) to vary the "push-up" force and the angular relationship of the surface 80 relative to the longitudinal axis $A_x$ can be varied between some range (e.g., lines C and D) vary the "pull-down" force. In some cases, the angular relationship of the surfaces 82 and 80 can be changed so as to eliminate the surface 84. Other profiles for the projections, serrations, or teeth 26 include smoothly curved or sinuous or sinusoidal surfaces as well as combinations of curved and linear surfaces.

In a typical installation, the user separates the two legs 58 to the spring clip 56 to release the stem 20 and then pulls or extends the stem 20 relative to the stem-receiver 40 to its full extensible length. The user then releases the two legs 58 of the spring clip 56. The light-bulb converter 70 of the now-extended assembly is threaded into the original light socket 18-1 in the can light 10 (FIG. 1) with the grounding clip 90 (FIGS. 7A-7D) contacting some portion of the interior the can 16. The user then "pushes-up" on the stem-receiver 40 (in FIG. 8) or the stem 20 (FIG. 9) to cause the stem 20 to retract into the stem-receiver 40 until the cross-bar 60 is at the correct position; after which the medallion 102 is secured into position via the nipple 104 or other attaching hardware.

The major components of the adjustable adaptor assembly, particularly the stem and the stem-receiver, can be manufactured or molded from metal, plastic resin, or fiber-reinforced plastics, etc. or some combination thereof.

The present invention advantageously provides an adaptor kit system for use with can light assemblies to increase the usefulness of those assemblies by allowing the installation of various devices hanging lamps and/or flush-mount lamps or similar devices.

As will be apparent to those skilled in the art, various changes and modifications may be made to the illustrated embodiment of the present invention without departing from the spirit and scope of the invention as determined in the appended claims and their legal equivalent.

The invention claimed is:

1. An adjustable adaptor assembly for converting a can light of the type having an opening into an interior portion thereof defined by interior electrically conductive surfaces and having an Edison-screw electrical socket having screw-threads intended for receiving a light-producing lamp or device, the adjustable adaptor assembly adapting the can light to accept an auxiliary fixture, said assembly comprising:

an extensible assembly including a stem-member adjustably and telescopically received within a stem-receiver along an assembly axis, the stem receiver including an internal axially extending bore for receiving the stem-member for relative telescoping movement between a fully extended position and at least one other position, said stem-member having an elongated slot formed therein having a length dimension substantially parallel to the assembly axis, said stem-member having a base member having screw-threads for mechanical and electrical engagement with the Edison-screw electrical socket of the can light, said stem-receiver having structure for mating with a cross-bar;

a mechanical member having a first end fixed to said stem-receiver and a second end extending into the elongated slot in said stem member to limit relative axial movement between the stem-member and the stem-receiver to a distance not greater than the length dimension of the elongated slot and engage with an end of the elongated slot when the stem-member is in its fully extended position to prevent the stem-member from separating from the stem-receiver;

said stem-member having a plurality of serrations or teeth thereon defining a corresponding plurality of axially spaced detent positions along said stem-member;

a resilient spring member connected to the stem-receiver yieldably engaging at least a one of the plurality of serrations or teeth to maintain the positional relationship of said stem-member and said stem-receiver, whereby the application of an axially directed force causes the resilient spring member to yieldably move from a current detent position to another detent position and thereagain maintain the positional relationship of said stem-member and said stem-receiver thereat;

a unitary resiliently biased electrically-conductive spring-wire connected at one end thereof to said stem-member, the spring-wire extending to a remote end thereof and having a length thereof sufficient for the remote end of said spring-wire to electrically contact an interior electrically conductive surface of the can light as said base member of said stem-member is rotated into the electrical socket of the can light, the remote end of the spring wire configured to slide along the interior electrically conductive surface of the can light while resiliently maintaining electrical contact therewith as the base member is further rotated to a full mechanical and electrical engagement with the electrical socket of the can light, an electrical wire connected to said resiliently biased electrically conductive spring-wire at the one end thereof and of sufficient length to connect to a ground portion of an auxiliary fixture.

2. The adjustable adaptor assembly of claim 1, wherein said stem-member includes at least two flat surfaces.

3. The adjustable adaptor assembly of claim 2, wherein, the internal axially extending bore includes two flat surfaces thereof, each flat surface for engaging a one of said two flat surfaces of said stem-member for relative sliding movement therebetween.

4. The adjustable adaptor assembly of claim 1, wherein the resilient spring member includes at least first and second leg members, each leg member for yieldably engaging at least a one of the plurality of serrations or teeth to maintain the positional relationship of said stem-member and said stem-receiver.

5. The adjustable adaptor assembly of claim 1, wherein at least a one of the plurality of serrations or teeth are defined by first and second flat surfaces that define a detent position therebetween.

\* \* \* \* \*